United States Patent [19]

Caton

[11] Patent Number: 4,810,307

[45] Date of Patent: Mar. 7, 1989

[54] STARCH HYDROLYZATE PRODUCT AND METHOD FOR PRODUCING SAME

[75] Inventor: Dennis W. Caton, Marion, Iowa

[73] Assignee: Penford Products Co., Cedar Rapids, Iowa

[21] Appl. No.: 170,705

[22] Filed: Mar. 14, 1988

Related U.S. Application Data

[63] Continuation of Ser. No. 436, Jan. 5, 1987, abandoned.

[51] Int. Cl.$^4$ ............................ C13F 3/02; C08B 30/00
[52] U.S. Cl. ........................................... 127/63; 127/67; 127/59; 127/70; 127/38; 426/454; 426/460; 426/518; 426/520; 426/549; 426/626; 426/658; 426/661
[58] Field of Search ..................... 127/67, 70, 38, 63, 127/59; 426/454, 460, 518, 520, 549, 626, 658, 661

[56] References Cited

U.S. PATENT DOCUMENTS

| | | | |
|---|---|---|---|
| 3,221,338 | 11/1965 | Segal | 426/442 |
| 3,366,484 | 1/1968 | Weiss et al. | 426/454 |
| 3,396,034 | 8/1968 | Blondheim et al. | 426/584 |
| 3,639,169 | 2/1972 | Broeg et al. | 127/63 |

OTHER PUBLICATIONS

John Swientek "Compaction/Granulation of Powders Improves Solubility, Ends Dusting", Food Processing, Jan. 1985, vol. 46, No. 1, pp. 90–91.

Primary Examiner—H. M. S. Sneed
Assistant Examiner—Chung K. Pak
Attorney, Agent, or Firm—Marshall, O'Toole, Gerstein, Murray & Bicknell

[57] ABSTRACT

A method for improving the properties of particles of a starch hydrolyzate product made by the partial hydrolysis of cereal and root based starches. Particles of starting material are blended with a volatile liquid other than water, and the resulting blend is compacted in a roller compactor without extraneous lubricant, to form a sheet. The sheet is broken into small particles which are sieved and dried. The resulting particles are non-spherical, appear crystalline under a light microscope and have a surface topography comprising cracks, crevices and fissures. These particles have good solubility, a bulk density comparable to the starting material, and no flow or dusting problems.

8 Claims, 1 Drawing Sheet

STARCH HYDROLYZATE PRODUCT AND METHOD FOR PRODUCING SAME

This application is a continuation of application Ser. No. 000,436, filed Jan. 5, 1987, now abandoned.

BACKGROUND OF THE INVENTION

The present invention relates generally to starch hydrolyzate products and to methods for producing such products and more particularly to a method for producing a particulate maltodextrin product which has both a relatively high bulk density and a relatively high solubility in water compared to other maltodextrin products of the same or finer particle size.

Starch hydrolyzate products, such as maltodextrins, are produced by the partial hydrolysis of cereal or root base starches, preferably corn, waxy corn or potato starch. Maltodextrins are commercially available in spray dried, particulate form, and they generally have a relatively low sweetness level, expressed as dextrose equivalent (D.E.), below 20 D.E.. When the D.E. is 20 or above, the starch hydrolyzate product is considered to be a sweetener, and a statement to this effect must be included on the label of any food or the like containing a product having a D.E. of 20 or above. Such foods cannot be characterized as 100% artificially sweetened, a characterization which is oftentimes desireable from a marketing standpoint. Because maltodextrins have a D.E. below 20, they can be used as a bulking agent or carrier for synthetic sweeteners (e.g. aspartame), and the resulting product can be characterized as 100% artificially sweetened.

Other properties of commercially available maltodextrins include a low moisture content, e.g. 4–6%, a bulk density of 0.4–0.7 g/cc, and a relatively fine particle size, e.g. 95% finer than 100 mesh and 50% finer than 200 mesh. (All particle sizes are expressed herein as U.S. Standard mesh).

Conventional commercially available maltodextrins, produced by the partial hydrolysis of starch, are difficult to completely hydrate, i.e. to dissolve in water. Because of the fine particle size, such maltodextrins require high shear mixing and low rates of addition to the water or other dissolution liquid in order to avoid the formation of small agglomerates of maltodextrin particles which are wet on the outside but dry within. The fine particle size also creates dusting and flow problems and static charge problems when high speed packaging equipment is employed to package a product containing such fine particles.

There are procedures for treating maltodextrins to make them hydrate more readily. One such procedure comprises spraying, onto the maltodextrin particles, a 50/50 mixture by weight of alcohol and water (or water alone) while suspending the particles in a fluid-bed granulator/dryer in which the maltodextrin and alcohol/water solution are mixed to form an agglomerate which is granulated, dried and sieved to the desired particle size distribution (e.g. −20 to +80 mesh). The result is a dry, free-flowing granulation with no fines. The agglomerate particles are clusters having spherical and egg-shaped configurations and comprising smaller individual particles loosely held together with a minimum of particle-to-particle contact. The agglomerates or clusters contain numerous voids which can be readily infiltrated by water during hydration, and the voids significantly increase the rate of hydration or solution. A drawback to this treatment is that it reduces the bulk density of the maltodextrin too far below that of the starting product, e.g. to 0.16–0.35 g/cc, which is undesirable for the reason described in the following paragraph.

Certain food products such as artificial/nutritive sweeteners are typically packaged in one gram packets, employing high speed packaging equipment. In such high speed packaging equipment, the agglomerated particles described in the previous paragraph would be susceptible to static charge and, due to their low bulk density, it would become difficult to fill one gram packets on a uniform weight basis with agglomerated particles.

There are procedures for increasing the bulk density of maltodextrin particles, but these procedures have other drawbacks. One such procedure is to compress the agglomerated particles described above into tablets or slugs of increased density which can then be milled and sieved to the desired particle size distribution. The drawbacks of this procedure include the fact that all the voids have been compressed out of the resulting densified particles, thereby forming a solid body which can go into solution only by surface erosion, thus significantly decreasing the rate of solution. In addition, a lubricant is required to separate the tablet from the die cavity in which it was compressed, and this lubricant is typically a hydrophobic powder (e.g. magnesium stearate, calcium stearate, hydrogenated vegetable oils, etc.). The hydrophobic, powdered lubricant is carried over as a residue on the particles, and it not only retards dissolution of the particles, but also it leaves an objectionable scum or film on the surface of the aqueous solution in which the particles have been dissolved.

The tableting, milling and sieving procedure described above can also be employed on commercially available maltodextrins to eliminate the relatively fine powdered form in which it normally occurs. However, the resulting product has relatively poor dissolution properties and leaves a scum in the dissolving liquid. The commercially available maltodextrin can also be treated by passing the fine powder through two pressurized rolls in a roller-compactor. This forms the powder into a compacted sheet which can then be milled or granulated and sieved to the desired particle size distribution. The drawbacks to this procedure are numerous, however.

One such drawback is that the rolls quickly become warm. The maltodextrin then begins to stick to the rolls which forces a shut down of the equipment. Some of this sticking can be overcome by circulating cooling water through the rolls, but to fully prevent the maltodextrin from sticking to the rolls, a lubricant must be added to the powder. However, this produces the same problems as occur in the tableting procedure when a lubricant is employed to help separate the tablets from the die cavities: there is a carry-over of lubricant onto the resulting particles, and this retards dissolution of the particles and leaves an objectionable scum or film in the dissolving liquid. Another drawback to the roll compacting procedure is that the resulting densified particles can only go into solution by surface erosion, thereby decreasing the rate of solution.

SUMMARY OF THE INVENTION

The present invention produces a particulate maltodextrin product without the drawbacks of the products described above. The product has increased bulk density compared to an agglomerated product, whereby static charge has little adverse effect on packaging at high speeds, and the product dissolves without leaving a scum or other objectionable material floating on the surface of the dissolving liquid. In addition, the product of the present invention has an increased rate of solution comparable to agglomerated products. All of these properties can be obtained while providing the maltodextrin with a desired particle size distribution which is free flowing, without dusting, and compatible with high speed packaging equipment.

A product having the properties described above is obtained, in accordance with the present invention, by mixing commercially available, particulate maltodextrin with a liquid, such as ethyl alcohol, to form a blend of the particulate maltodextrin and liquid. The blend is then compacted between a pair of compacting rolls, in a conventional roller/compactor, to form a sheet of material composed of formerly discrete maltodextrin particles crushed together, with the liquid in the blend occupying spaces between the crushed-together particles. The sheet is then broken up, employing conventional granulators or milling equipment, into compacted particles of maltodextrin at least a substantial portion of which appear crystalline under a light microscope and have a surface topography comprising cracks, crevices and fissures. The breaking step normally liberates at least a substantial portion of the liquid which occupied the spaces between the crushed-together particles in the sheet. The particles are then dried and screened. The drying step drives off a substantial portion of the remaining liquid which previously occupied the spaces between the crushed-together particles.

The end result is a mass of dried, compacted particles of maltodextrin with at least a substantial portion of the particles having a a crystalline appearance under a light microscope and a surface topography comprising cracks, crevices and fissures into which a dissolving liquid can infiltrate. The physical characteristics described in the preceding sentence results in a relatively rapid solution rate for the particles.

Another advantage of the process described above is that, during the compacting step, some of the liquid in the blend is squeezed to the exterior of the sheet to coat the surfaces of the compacting rolls with that liquid, thereby cooling and lubricating the rolls and preventing the maltodextrin from sticking to the roll surfaces. This eliminates the need to employ an extraneous lubricant for the rolls to prevent the maltodextrin from sticking. As a result, there is no carry-over lubricant on the particles to slow down the solution rate, and there is no residual scum on the solution liquid following dissolution of the maltodextrin particles.

The resulting maltodextrin product has an untapped bulk density of at least about 0.5 g/cc for particles in the size range $-30$ to $+80$ mesh. Untapped bulk density refers to the bulk density of the product when it is initially introduced into a container without further disturbance. Tapped bulk density refers to the bulk density of the particles after the container has been tapped on its side causing the particles to settle and fill in some of the air spaces below the former top surface level of the particles in the container, thereby somewhat increasing the bulk density of the material compared to the untapped bulk density thereof.

Other features and advantages are inherent in the product and method claimed and disclosed or will become apparent to those skilled in the art from the following detailed description in conjunction with the accompanying diagrammatic drawings.

DETAILED DESCRIPTION

Figures 1, 2, 3, 4:
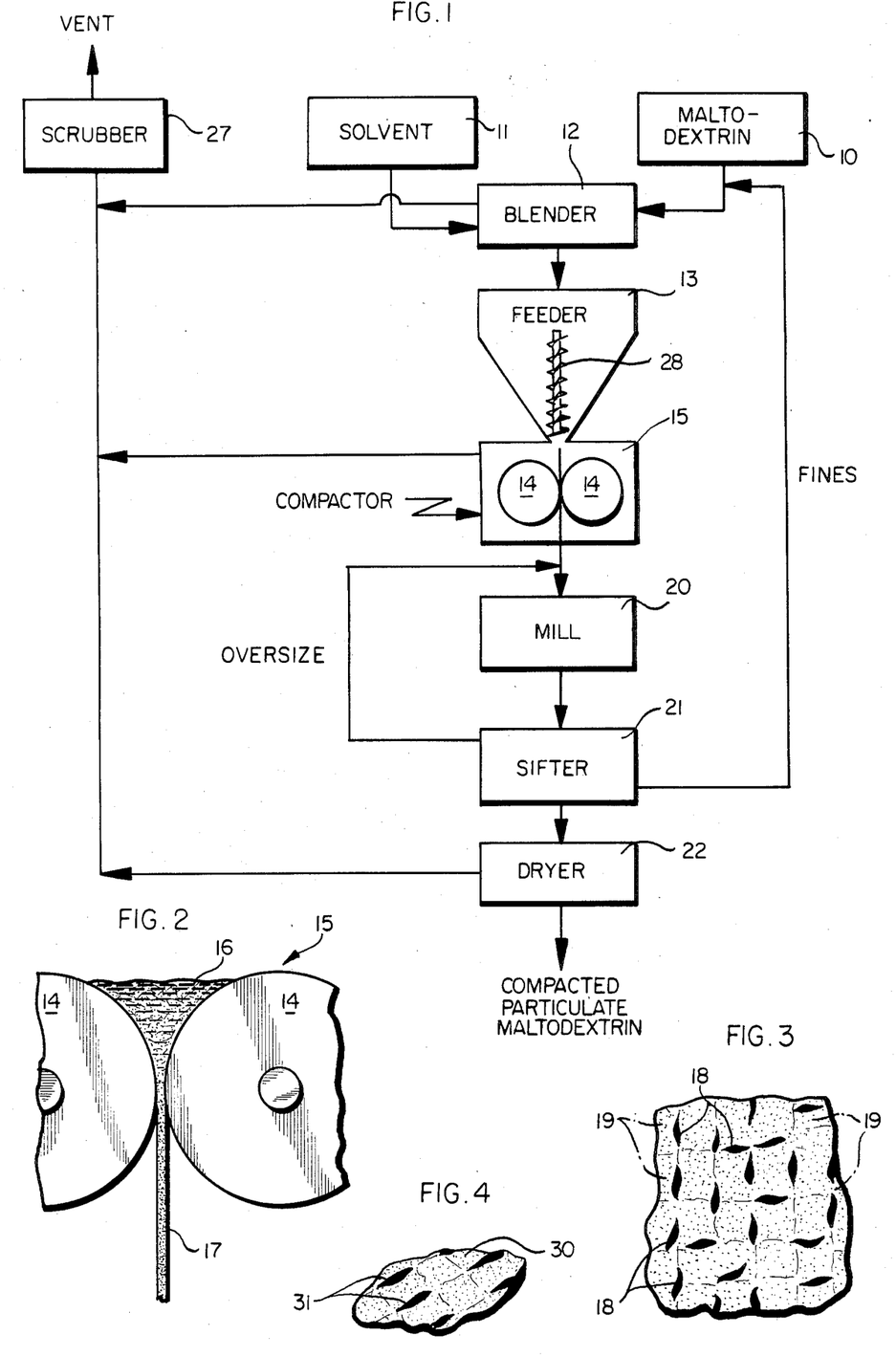
FIG. 1 is a flow sheet illustrating an embodiment of a method in accordance with the present invention.
FIG. 2 is a fragmentary elevational view illustrating a compacting step in the method.
FIG. 3 is an enlarged fragmentary view illustrating a portion of a compacted sheet produced by the compacting step of the present method.
FIG. 4 is an enlarged sectional view of a particle produced in accordance with the present invention.

Referring initially to FIG. 1, there are two basic starting materials for a method in accordance with an embodiment of the present invention, namely commercially available, particulate maltodextrin and a liquid, e.g. 95% ethyl alcohol. A typical commercially available, particulate maltodextrin is produced by spray-drying, and the shape of the resulting particles is essentially spherical. Initially, maltodextrin particles from a hopper 10 and liquid from a tank 11 are introduced into a blender 12 of conventional construction. The liquid and the maltodextrin particles are mixed in blender 12 to form a blend of the two ingredients, and the blend is then introduced into a feeder 13 which may be in the form of a hopper with an auger or screw feeder 28 down the center to feed the blend of maltodextrin particles and liquid between the rolls 14, 14 of a roller/compactor 15 of conventional construction.

The blend is in the form of a damp powder 16 (FIG. 2) which is compacted between rolls 14, 14 to form a sheet 17 of material composed of formerly discrete maltodextrin particles crushed together, with the liquid from the blend occupying spaces 18, 18 between the crushed-together particles 19, 19 (FIG. 3). During the compacting step, the liquid not only occupies spaces between the crushed-together particles, but also, the liquid prevents the further filling of those spaces with solid maltodextrin thereby assuring that the desired particle surface topography will ultimately be obtained.

After the compacting step, sheet 17 is introduced into a granulator or mill 20 of conventional construction and in which the sheet is broken up into compacted particles of maltodextrin at least a substantial portion of which are non-spherical and, under a light microscope appear to be crystalline. These particles have a surface topography comprising cracks, crevices and fissures. The breaking step liberates at least a substantial portion of the liquid which occupied spaces 18, 18 between compressed-together particles 19, 19 in sheet 17. Some of the liberated liquid vaporizes and passes off from the mass of particles at mill 20.

The particles resulting from the breaking step are introduced into a sifter 21 which screens the particles to produce the desired particle size distribution (e.g. $-30$ mesh to $+80$ mesh). Oversized particles are then recycled back to mill 20 and undersized particles, i.e. fines, are recycled back to blender 12. Particles having the desired size distribution are then introduced into dryer 22 where the particles are dried to drive off at least a substantial part of the remaining liquid which previously occupied the spaces 18, 18 between the compressed-together particles 19, 19 in sheet 17. The drying step may precede the sizing step.

Fumes driven off at dryer 22, as well as fumes emanating from compactor 15 and blender 12 are directed to a scrubber 27 of conventional construction and operation and from which an exhaust is vented to the atmosphere.

Referring to FIG. 4, at least a substantial portion of the particles exiting from dryer 21 are dried, compacted, particulate maltodextrin particles 30 having a non-spherical shape with the microscopic appearance described above, and a surface topography comprising cracks, crevices and fissures 31, 31. The shape and surface topography of particle 30 are desirable from a solubility standpoint because non-spherical particle 30 has more surface area than a spherical shaped particle of the same volume, and the cracks, crevices and fissures 30, 30 provide additional surface area as well as locations into which a dissolving liquid can infiltrate.

Referring back to roller compactor 15 and FIGS. 2-3, as damp powder 16 is squeezed between rolls 14, 14 in the course of the compacting step, some of the liquid in the damp power is squeezed to the exterior of sheet 17 to coat the surfaces of rolls 14, 14 with the liquid. This cools and lubricates the rolls and prevents the maltodextrin undergoing compacting from sticking to the roll surfaces. As a result, it is unnecessary to employ, for the surface of the compactor rolls, an extraneous lubricant which would leave a scum following dissolution of the compacted particles in a solution liquid. The term "extraneous lubricant" refers to a lubricant other than the liquid from the blend which occupies spaces 18, 18 between the crushed-together particles 19, 19 as a result of the compacting step see (FIG. 3).

The maltodextrin employed herein is preferably made from corn (ncluding white corn) based or waxy corn based or potato based starch. The maltodextrin may have a D.E. in the range 1-19, preferably a D.E. of at least 10 for corn starch or waxy corn starch-based maltodextrins and greater than 15 for potato start-based maltodextrins.

At 20 D.E. or more, one will obtain the desired physical properties in an end product based on any of the cereal or root starches described above, but the product would not qualify technically as a true maltodextrin because the sweetness level would be too high. Nevertheless, where the sweetness level is not a criterion, a product having a D.E. of 20 or more would be useful, as a bulking agent or carrier, to the same extent as a true maltodextrin. Therefore, in a broad sense, the present invention relates to starch hydrolyzate products, generally, i.e. products produced by the partial hydrolysis of cereal or root base starches, having a D.E. of 20 or more as well as a D.E. below 20 (true maltodextrins). For purposes of the present invention, the former may be considered an equivalent of the latter in situations where a sweetness level of 20 D.E. or above is permissible in the bulking agent. When produced from corn or waxy corn starches, such products are called corn syrup solids.

As noted above, a liquid is employed in a method in accordance with the present invention, to occupy spaces between the maltodextrin particles when the latter are compacted. This liquid should also have the ability to lubricate compactor rolls 14, 14 and should preferably be relatively volatile (i.e. more volatile than water) to facilitate the removal of the liquid after the breaking step and during drying. In addition to ethyl alcohol, examples of other liquids which may be employed include acetone, hexane, cyclohexane, methyl ethyl ketone, ethyl acetate, propyl alcohol, butyl alcohol and pentyl alcohol.

Water may not be employed as a liquid in the method of the present invention, and the water content of the liquid must be controlled with regard to the following considerations. Maltodextrin is hygroscopic and normally contains 4-6 wt.% of bound water. If the total water content of the blend exceeds 7 wt.% (e.g. 8 wt.%), there are severe processing problems, including: a sticking of the blend to the rolls, during the compacting step; a lumping or agglomeration of the blend during the breaking step, producing too many oversized particles; and the forming of hard, golf ball sized lumps during blending, so that the blend can't even be compacted. Therefore, the amount of water which can be added with the processing liquid is restricted to one extent by the amount of bound water in the maltodextrin particles, and the added water will typically be less than 2% of the weight of the blend so that the total water content of the blend is no more than 7 wt.% (e.g., 4-6 wt.% bound water plus added water in the range 1-1.5 wt.% to produce a total of 5.5-7 wt.%).

The ratio of liquid to maltodextrin particles should be sufficient to occupy the desired volume of spaces 18, 18 in sheet 17 as well as to help lubricate the surface of the rolls in the roller/compactor. Typically, the liquid constitutes 5-15%, by weight, of the maltodextrin employed. A preferable amount of liquid, as a wt.% of the maltodextrin, is 8-12%.

The liquid concentration should be preferably at least 95%, although a lower liquid concentration of 90% may be permissible. The liquid concentration, which is the inverse of the water content, should be coordinated with (a) the amount of the liquid and (b) the bound water content of the maltodextrin particles to assure a water content in the blend no greater than 7 wt.% and above 3 wt.%. Preferably the water content of the blend should be 4.6 wt.%. As an example, with a liquid concentration of 90% and a liquid amount equal to 10% of the weight of the maltodextrin, the amount of water in the blend would be about 1% greater than the amount of water in the maltodextrin, and if the latter were 6 wt.%, the water content of the blend would be about 7 wt.%.

During the compacting step, sufficient pressure should be employed to produce the desired bulk density but not so great as to cause the product to stick to the rolls. Generally, a pressure in the range 60-100 kg/cm$^2$ is satisfactory.

The temperature employed during the drying step will depend upon the volatility of the liquid. For 95% ethyl alcohol, a temperature of about 60° C. may be employed, for example. For any of the liquids described above, a permissible drying temperature will be somewhere in the range 40° to 100° C. Vacuum drying may be employed at lower temperatures. The purpose of the drying step is to drive off the remainder of the liquid which was added to form the blend. The aim is to produce a particulate maltodextrin having the same water content (4-6 wt.%) as the starting material with substantially no extraneous liquid present. In food products, it is especially important to completely drive off all the various liquids listed above as useful in forming the blend. There is no point in driving off water below the 4-6 wt.% range because the maltodextrin particles will pick up moisture from the atmosphere to achieve a water content in that range. Desirably, the extraneous liquid employed to form the blend is more volatile than water so that no energy need be expended driving off water in order to drive off the extraneous liquid.

The particle size distribution produced by the screening or sifting step depends upon the properties, attributable to a particular particle size, which may be desired. For example, if a particle size is too large, it won't mix well with other ingredients in the end product, and a given volume of material formed into large particles will have decreased solubility compared to the same volume formed into smaller particles, due to the greater surface area of the latter. If the particle size is too small, the particulate material would not have the desired flow rate properties, and there would be dusting problems and the like. Generally speaking, a desirable particle size distribution range would be between minus 30 and plus 80 mesh on the U.S. Standard sieve scale, although a somewhat finer particle size (e.g. plus 100 mesh) may be permissible.

The solubility of the product will vary with the particle size, but for a given particle size, a particle in accordance with the present invention, having the shape and surface topography described above in connection with particle 30 in FIG. 4 has a dissolution rate greater than particles of the same size without the aforementioned shape and surface topography.

Further examples of a method and product in accordance with the present invention are described below.

EXAMPLE 1

A series of samples were prepared employing 10 D.E. maltodextrin (corn base), one sample being blended with 5 wt.% and another with 10 wt.% of 95% ethyl alcohol, expressed as a wt.% of the maltodextrin. In a third sample the 10 D.E. maltodextrin was blended with 2 wt.% pregelatinized, unmodified potato starch. A fourth sample consisted of the 10 D.E. maltodextrin, alone, employed as a control. The samples were fed by a screw feeder through a conventional roller/compactor and the relative speeds of the two pieces of equipment were adjusted so that the blends and the control were first deaerated and then compacted between two pressurized rolls. Compaction pressures of 50, 75 and 100 kg/cm$^2$ were employed for each of the samples.

The control sample (maltodextrin alone) began sticking to the rolls after several minutes at 75 kg/cm$^2$, and after about 10 minutes the machine has to be turned off and the rolls cleaned. Decreasing or increasing the pressure to 50 or 100 kg/cm$^2$ would not relieve the sticking.

The blend with the potato starch-based addition did not relieve the sticking, nor did it provide a product having the detailed dissolution and disintegration properties when introduced into an aqueous solution liquid.

The blend containing 5 wt.% of 95% ethyl alcohol ran well at 75 kg/cm$^2$ with only slight sticking to the rolls. At 100 kg/cm$^2$, there was no sticking but there was a loud, cracking noise, which is undesireable. At 50 kg/cm$^2$, the blend ran through the compactor rolls without sticking, bit it produced too many fines after the subsequent breaking step. When 10 wt.% of the same ethyl alcohol was employed in the blend, the product ran at 75 kg/cm$^2$ with no sticking to the rolls at all.

EXAMPLE 2

Maltodextrin (waxy corn base) having a 15-18 D.E. was mixed with 95% ethyl alcohol. The alcohol constituted 9 wt.% of the maltodextrin and was introduced into a conventional blender containing the maltodextrin over a 15 minute period followed by a further 15 minutes of mixing. The starting material (maltodextrin alone) had a tapped bulk density of 0.73 g/cc. After the blending step, the resulting blend had a tapped bulk density of 0.65 g/cc.

Samples of the blend and the maltodextrin alone were fed through a roller compactor. At a pressure of 120 kg/cm$^2$, the blend stuck to the rolls and made loud cracking noises. When the pressure was reduced to 50 kg/cm$^2$, the cracking noises dissipated, but the resulting sheet was soft and generated fines (finer than 80 mesh) and a lot of dust. When the pressure was increased to 80 kg/cm$^2$ there was no sticking of the product to the rolls, the sheet was not too soft, and there was no problem with fines or dust.

When the control (maltodextrin alone) was run through the roller compactor under the same conditions as the blend but with no alcohol, the control stuck to the rolls at all three pressures described in the preceding paragraph.

After the compacting step, the resulting sheet-like product was run through a granulator to break up the sheet into particles. The granulator was of conventional construction employing a screen therein which determined the size of the exiting particles. A 20 mesh screen gave too fine a granulation. A 12 mesh screen gave a coarser granulation, and the resulting particle size distribution was:

40% retained on a 30 mesh screen
34% retained on a 80 mesh screen
26% passed through an 80 mesh screen The solubilities of particles produced from the blend and from the control (maltodextrin alone) were checked. Particles of each, in the size range minus 30 to plus 80 mesh, were dissolved without stirring, employing one gram of the material in 240 ml of water at ambient temperature. The dissolution time for the particles made from the alcohol-containing blend was 9 minutes at 76° F. (24° C.) whereas the control required 12 minutes at 78° F. (25° C.).

Larger particles having a size in the range minus 12 to plus 30 mesh, from both the control and the alcohol blend, were tested for solubility. Because the larger particles have less surface area per unit weight, they should take longer to dissolve. At 65° F. (18° C.), the control particles (maltodextrin alone) took 25.2 minutes to dissolve while the particles from the alcohol treated blend took only 10.5 minutes to dissolve. The particles made from the blend have surface cracks, crevices and fissures to a much greater extent than particles made from the control. The particles made from the control include many spheres whereas the particles made from the blend are irregularly shaped to a much larger extent.

Before drying, the tapped bulk density of the compacted, granulated particles made from the alcohol treated blend was 0.72 g/cc, while after drying, the untapped bulk density was 0.59 g/cc and the tapped bulk density was 0.69 g/cc. The unblended, unmoistened, dry control material had an untapped bulk density, after compacting and granulating, of 0.60 g/cc.

The moisture content of the maltodextrin alone was 5.4 wt.%. After blending, compacting and granulating, the combined moisture-alcohol content was 7.3 wt.% which was reduced to 6.3 wt.% after drying.

A comparison was made between particles of this example, made in accordance with the present invention, and conventional maltodextrin particles (untreated). The comparison employed solution calorimetric measurements made on several samples of minus 100 mesh particles, both those made in accordance with the present invention and those made from maltodextrin alone. The average heat of solution for the control material (maltodextrin alone) was $-7.083 \pm 0.027$ calories per gram. The average heat of solution for a material in accordance with the present invention was $-6.159 \pm 0.033$ calories per gram. Accordingly, a product prepared in accordance with the present invention differs measurably from the control product prepared from maltodextrin alone.

A comparison was made between the specific surface areas of particles of this example, made in accordance with the present invention, and particles of untreated maltodextrin used as the starting material. Similarly sized particles of $-100$ mesh were employed. Specific surface area is expressed as area per unit weight ($m^2/g$). The following data was obtained.

| Sample | | Weight (g) | Total surface area ($m^2$) | Specific surface area ($m^2/g$) |
|---|---|---|---|---|
| (a) | Untreated maltodextrin particles | 0.82 | 0.16 | 0.19 |
| (b) | Treated particles | 3.50 | 4.37 | 1.25 |

The above data reflects a specific surface area, for particles treated in accordance with the present invention, over six times greater than that of the starting material.

A comparison was also made of the porosity characteristics of the same two materials identified above as samples (a) and (b), with the following results:

| Sample | Amount (g) | Pore Volume (ml) | Pressure to fill 90 vol. % of pores with Hg ($kg/cm^2$) |
|---|---|---|---|
| (a) | 0.4285 | 0.1780 | 2,753 |
| (b) | 0.5106 | 0.5106 | 39.6 |

Examples 3-5 below show the results obtained when the maltodextrin was blended with various liquids. The amount of liquid is expressed as a percent of the weight of maltodextrin. Solubility was determined using the solubility test described several paragraphs above, employing a size range distribution of $-30$ to $+80$ mesh for maltodextrin prepared in accordance with the present invention.

With respect to the column entitled "Microscopic Examination", the "spheres" mentioned therein are a carryover from the original spherical shape of the maltodextrin particles before processing, whereas the "crystals" mentioned therein are the type of particles produced in accordance with the present invention.

The term "crystals" as used herein refers merely to crystalline-appearing maltodextrin particles, but the particles are not true crystals. Rather, they are amorphous and only appear crystalline under a light microscope. The particles with crystalline appearance have a variety of surface cracks, crevices and fissures and look like raisins.

EXAMPLE 3

A group of blends were prepared by mixing 4000 g of maltodextrin with from 5% to 15% (by weight of the maltodextrin) of various liquids. Each blend was then processed on a roller compactor, at a roll pressure of about 80 $kg/cm^2$. After compacting, the material was run through a granulator using an 18 mesh screen and then dried for about 8 hours in a pilot plant tray drier.

The blending and compacting conditions are summarized in Table I. The resulting dried products were evaluated using a variety of physical tests, and the test data are shown in Table II.

From Example 3 one may draw the conclusions described below.

Other liquids besides ethanol (ethyl alcohol) can be used in accordance with the present invention, although nothing worked better than ethanol. Hexane, cyclohexane and acetone were not entirely satisfactory, but other attempts with these liquids, described further below, show that acetone and hexane give better results with shorter mixing times due to there being less liquid evaporation during mixing. Hexane, cyclohexane and acetone did not process as well as ethanol on the rolls. Isopropyl alcohol (isopropanol) worked almost as well as ethanol on the rolls.

The amount of added liquid is important. With 5 wt.% of 95% ethanol there was a little sticking on the rolls, and the final product did not perform as well in the solubility test. With 15 wt.% of 95% ethanol, a slurry of liquidy material was dripping off the rolls, and this could create a processing problem. 10 wt.% of 95% ethanol processed without difficulty when employing the same processing conditions and ingredients utilized with the 5 and 15 wt.% samples.

Added moisture is an extremely sensitive factor. At an ethanol concentration of 65% (35% $H_2O$), there is 3.5 wt.% $H_2O$ addition to the maltodextrin, and in the blender, the resulting mixture turned to "golf balls" that could not be compacted. At an 80% ethanol concentration (20% $H_2O$), or 2.0% $H_2O$ added to the maltodextrin, the mixture was processed in the rolls without difficulty, but the finished product did not pass the solubility test and was actually worse than the starting maltodextrin.

Under the conditions described in Table I, a better product can be made from a 10 D.E. corn starch-based maltodextrin than from a 10 D.E. potato starch-based maltodextrin.

TABLE I

| Sample | Liquid | Amount of Liquid* | Maltodextrin Used | Compacting Rolls | | Screw Feeder | | Comments |
|---|---|---|---|---|---|---|---|---|
| | | | | RPM | AMPS | RPM | AMPS | |
| 3A | Hexane | 10.0 | 15 D.E. from waxy corn | 14 | 6 | 10 | 2.2 | Some sticking and build up on rolls; slowed speed somewhat |
| 3B | Cyclohexane | 10.0 | 15 D.E. from waxy corn | 14 | 6.5 | 10 | 2.4 | Same as A |
| 3C | Acetone | 10.0 | 15 D.E. from waxy corn | 10-18 | 6.5 | 10-30 | 2.2 | Same as A |
| 3D | Isopropanol | 10.0 | 15 D.E. from waxy corn | 18 | 7.0 | 25 | 2.3 | Processed without difficulty |

TABLE I-continued

| Sample | Liquid | Amount of Liquid* | Maltodextrin Used | Compacting Rolls RPM | Compacting Rolls AMPS | Screw Feeder RPM | Screw Feeder AMPS | Comments |
|---|---|---|---|---|---|---|---|---|
| 3E | 95% Ethanol | 5.0 | 15 D.E. from waxy corn | 18 | 7.0 | 25 | 2.3 | Processed without major difficulty, slight sticking towards end |
| 3F | 95% Ethanol | 15.0 | 15 D.E. from waxy corn | 18 | 7.0 | 25 | 2.3 | Too much total solvent; some liquid dripped off rolls |
| 3G | 95% Ethanol | 10.0 | 15 D.E. from waxy corn | 18 | 7.5 | 25 | 2.3 | Same as D |
| 3H | 80% Ethanol | 10.0 | 15 D.E. from waxy corn | 18 | 8.0 | 25 | 2.3 | Same as D |
| 3I | 65% Ethanol | 10.0 | 15 D.E. from waxy corn | 18 | 8.0 | 25 | 2.3 | Mixture turned into numerous hard lumps; could not be processed |
| 3J | 95% Ethanol | 10.0 | 10 D.E. from corn | 18 | 7.0 | 25 | 2.25 | Same as D |
| 3K | 95% Ethanol | 10.0 | 10 D.E. from potato | 18 | 7.0 | 25 | 2.3 | Product stuck quite badly to rolls; compacting was discontinued after a few minutes |

*As a wt. % of maltodextrin

TABLE II

| Sample No | Wt. % Volatiles | Particle Size Distribution % +30 | Particle Size Distribution % −30/+80 | Particle Size Distribution % −80 | Bulk Density g/cc Loose (untapped) | Solubility (1 g/240 ml) minutes | Microscopic Examination |
|---|---|---|---|---|---|---|---|
| 3A | 4.3 | 16.1 | 31.3 | 52.6 | 0.567 | 8.0,10.75 | Some crystals; a lot of original maltodextrin spheres |
| 3B | 4.2 | 19.2 | 43.7 | 37.1 | .654 | 9.0,10.42 | Same as A |
| 3C | 5.0 | 51.1 | 32.3 | 16.6 | .575 | 7.5,6.25 | Same as A |
| 3D | 5.0 | 44.5 | 39.4 | 16.1 | .561 | 6.5,4.88 | Mostly crystals; some spheres |
| 3E | 5.5 | 15.4 | 39.8 | 44.8 | .562 | 7.0,6.17 | — |
| 3F | 5.0 | 13.5 | 40.2 | 46.3 | .573 | 7.0,5.75 | Mostly crystals; some spheres |
| 3G | 5.7 | 39.5 | 43.9 | 16.6 | .578 | 6.5,4.75 | Mostly crystals; some spheres |
| 3H | 5.0 | 28.9 | 51.0 | 20.1 | .588 | 19.0,>17 | — |
| 3J | 5.0 | 30.5 | 48.5 | 21.0 | .586 | 6.5,5.75 | Same as G |
| 3K | 6.6 | 21.1 | 57.8 | 21.1 | .557 | 12.0,9.25 | Similar to G |
| Untreated Maltodextrin, 15 D.E., from waxy corn, used in 3A-I | 4.8 | | | | .572 | 10.0 | All spheres |

A specific surface area comparison was made between −100 mesh particles of the treated material of Example 3D and the starting material for this example (15 D.E. maltodextrin from waxy corn-based starch) with the following results, expressed as $m^2/g$:

| Treated Material | Starting Material |
|---|---|
| 1.068 | 0.19 |

EXAMPLE 4

Five different liquids were examined with the same maltodextrin (15 D.E. waxy corn starch based-product). In each case a 95% concentration of the liquid was employed to enable a comparison with 95% ethanol. The 5% $H_2O$ added to the acetone reduced its volatility, and its performance improved over that in Example 3. Thus, a small amount of added water seems to be beneficial with at least some of the liquids.

The mixtures were processed under essentially the same condition on the rolls, using 80 kg/cm² roll pressure. After compacting, samples 4A, 4B and 4F were granulated through a 16 mesh screen, while samples 4C and 4D were granulated through a 12 mesh screen. There were some equipment problems with the drier, resulting in incomplete drying, as reflected by the volatiles contents shown in Table IV.

The product and process conditions are summarized in Table III, while the product properties are shown in Table IV.

From Example 4, one may conclude that all the liquids tested performed well on the rolls and produced satisfactory products in accordance with the present invention.

TABLE III

| Sample | Liquid | Amount of Liquid* | Maltodextrin Used | Compacting Rolls RPM | Compacting Rolls AMPS | Screw Feeder RPM | Screw Feeder AMPS | Comments |
|---|---|---|---|---|---|---|---|---|
| 4A | 95% Ethanol | 10.0 | 15 D.E. from waxy corn | 15 | 6.5 | 25 | 2.5 | Processed without difficulty |
| 4B | 95% | 10.0 | 15 D.E. | 15 | 7.0 | 25 | 2.4 | Same as A |

TABLE III-continued

| Sample | Liquid | Amount of Liquid* | Maltodextrin Used | Compacting Rolls RPM | Compacting Rolls AMPS | Screw Feeder RPM | Screw Feeder AMPS | Comments |
|---|---|---|---|---|---|---|---|---|
| 4C | N—propanal 95% | 10.0 | 15 D.E. from waxy corn | 15 | 6.5 | 25 | 2.5 | Same as A |
| 4D | N—butanol 95% | 10.0 | 15 D.E. from waxy corn | 15 | 6.5 | 25 | 2.5 | Same as A |
| 4E | N—pentanol 95% Acetone | 10.0 | 15 D.E. from waxy corn | 15 | 6.5 | 25 | 2.5 | Same as A |

*As a wt. % of maltodextrin

TABLE IV

| Sample No | Wt. % Volatiles | Particle Size Distribution % +30 | Particle Size Distribution % −30/+80 | Particle Size Distribution % −80 | Bulk Density g/cc Loose (untapped) | Bulk Density g/cc Packed (tapped) | Solubility (1 g/240 ml) minutes | Microscopic Examination |
|---|---|---|---|---|---|---|---|---|
| 4A | 9.4, 9.5 | 26.8 | 35.4 | 37.8 | 0.552 | 0.592 | 7.0 | Mostly crystals; a few spheres |
| 4B | 9.9 | 27.2 | 23.5 | 49.3 | 0.530 | 0.576 | 7.5 | Same as 4A |
| 4C | 10.8, 10.0 | 42.0 | 30.0 | 28.0 | 0.531 | 0.568 | 6.25 | Many crystals; some spheres |
| 4D | 9.4 | 47.7 | 20.7 | 31.6 | 0.520 | 0.558 | 5.50 | Same as 4C |
| 4E | 9.0, 8.8 | 29.6 | 34.4 | 36.0 | 0.553 | 0.598 | 5.75 | Same as 4A |

A specific surface area comparison was made between −100 mesh particles of the treated material of Example 4E and the starting material for this example (15 D.E. maltodextrin from waxy corn-based starch) with the following results, expressed as $m^2/g$:

| Treating Material | Starting Material |
|---|---|
| 1.116 | 0.19 |

EXAMPLE 5

Four different maltodextrins and four different liquids were examined. Also the effect of different starting moistures in the maltodextrin was examined. The blends were made with 4000 g of the maltodextrin and 10% liquid based on the weight of maltodextrin. The blends were then compacted on a roller/compactor at 80 $kg/cm^2$ and then granulated through an 18 mesh screen. They were then dried for about 8 hours in a pilot plant tray drier.

The blending and compacting conditions are summarized in Table V, and the physical properties of the products and their starting maltodextrins are shown in Table VI.

From Example 5, one may draw the conclusions described below.

In addition to 15 D.E. waxy corn starch-based maltodextrin, several other maltodextrins, including 15 D.E. corn starch-based, 19 D.E. Potato starch-based, and 15 D.E. white corn starch-based, can be used, and they will all produce a satisfactory product in accordance with the present invention.

Hexane was tried again, but this time the mixing time was limited to avoid solvent evaporation during the blending step. A satisfactory product was produced, but there was some sticking to the rolls.

Two other liquids, methyl ethyl ketone and ethyl acetate, performed well and gave useful products.

The effect of the moisture ($H_2O$) content, this time of the starting material, was again observed. It was confirmed that the moisture content of the blend is an important factor and a processing condition which should be controlled. The 19 D.E. potato starch-based maltodextrin with a starting $H_2O$ of 8.4 wt.% was processed on the rolls without major difficulty (some sticking and some excess squeezed out liquid). However, the extra moisture caused the product to "cake up" or "set up" after granulation, making it extremely difficult to dry, sift and obtain a decent yield of acceptable product without a lot of additional processing. There were too many coarse particles which would require recycling. At 4.1 wt.% starting $H_2O$, this problem was reduced.

TABLE V

| Sample | Liquid | Amount of Liquid* | Maltodextrin Used | Compacting Rolls RPM | Compacting Rolls AMPS | Screw Feeder RPM | Screw Feeder AMPS | Comments |
|---|---|---|---|---|---|---|---|---|
| 5A | 95% Ethanol | 10.0 | 15 D.E. corn based | 18 | 7 | 25 | 2.5 | Processed without difficulty |
| 5B | 95% Ethanol | 10.0 | 15 D.E. white corn based | 18 | 7 | 25 | 2.5 | Same as 5A |
| 5C | 95% Ethanol | 10.0 | 19 D.E. potato based at 8.4% $H_2O$ | 18 | 7 | 25 | 2.5 | Solvent liquid squeezed out of rolls; some sticking to rolls** |
| 5C' | 95% Ethanol | 10.0 | 19 D.E. potato based at 4.1% $H_2O$ | 18 | 7 | 25 | 2.5 | Product was somewhat dustier coming off rolls |
| 5D | Hexane | 10.0 | 15 D.E. waxy corn | 18 | 7 | 25 | 3.0 | Extensive amount of sticking to rolls |

TABLE V-continued

| Sample | Liquid | Amount of Liquid* | Maltodextrin Used | Compacting Rolls RPM | Compacting Rolls AMPS | Screw Feeder RPM | Screw Feeder AMPS | Comments |
|---|---|---|---|---|---|---|---|---|
| 5E | 95% Methyl Ethyl Ketone | 10.0 | based Same as 5D | 18 | 7 | 20 | 2.8 | Minor amount of sticking to rolls |
| 5F | 95% Ethyl Acetate | 10.0 | Same as 5D | 18 | 7 | 25 | 2.7 | Same as 5A |

*As a wt. % of maltodextrin
**Between granulating and drying the product began to "set up" into golf ball-sized lumps. Product had considerable coarse material

TABLE VI

| Sample No | Wt. % Volatiles | Granulation % +30 | Granulation % −30/+80 | Granulation % −80 | Bulk Density g/cc Loose (untapped) | Bulk Density g/cc Packed (tapped) | Solubility (1 g/240 ml) minutes | Microscopic Examination |
|---|---|---|---|---|---|---|---|---|
| 5A | 5.7 | 23.8 | 42.7 | 33.5 | 0.586 | 0.645 | 6.5,5.5 | Mostly crystals; almost no spheres |
| 5B | 5.8 | 20.7 | 36.7 | 42.6 | .559 | .623 | 6.5,5.33 | Same as 5A |
| 5C | 5.6 | 44.5 | 37.7 | 17.8 | .614 | .678 | 6.67,5.33 | Same as 5A |
| 5C' | 7.0 | 10.8 | 51.0 | 38.2 | .571 | .647 | 7.71,6.67 | Same as 5A |
| 5D | 7.0 | 41.0 | 31.4 | 27.6 | .570 | .630 | 6.67,5.67 | Some crystals and some spheres |
| 5E | 6.0 | 36.0 | 41.4 | 22.6 | .624 | .704 | 6.33,6.00 | Mostly crystals; some spheres |
| 5F | 6.8 | 32.8 | 34.8 | 32.4 | .562 | .618 | 6.5,6.0 | Same as 5E |
| 15 D.E. corn-based maltodextrin uaws in 5A | 5.3 | | | | .467 | .532 | 8.0 | Some spheres; many irregularly shaped pieces |
| 15 D.E. white corn-based maltodextrin used in 5B | 4.7 | | | | .560 | .615 | 5.0 | Almost all spheres |
| 19 D.E. potato-based maltodextrin used in 5C and 5C' | * | | | | .450 | .500 | >10.0 | A few spheres; a lot of irregularly shaped pieces |
| 15 D.E. waxy corn-based maltodextrin used in 5D-F | 4.8 | | | | .572 | .635 | 10.0 | Almost all spheres |

*8.4 wt. % H₂O content in 5C;
4.1 wt. % H₂O content in 5C'

Specific surface area comparisons were made between −100 mesh particles of the treated materials of Examples 5A and 5B and their respective starting materials (15 D.E. maltodextrin from corn-based starch, for 5A, and 15 D.E. maltodextrin from white corn-based starch, for 5B) with the following results, expressed as $m^2/g$:

| Example | Treated Material | Starting Material |
|---|---|---|
| 5A | 0.938 | 0.227 |
| 5B | 1.739 | 0.192 |

The untreated starting material used in 5B, 15 D.E. white corn-starch based maltodextrin, had a bulk density comparable to the finished product in 5B and good solubility (see Table VI), but this untreated maltodextrin has a particle size so fine (95% minus 100 mesh and 50% minus 200 mesh) as to cause flow problems and dusting. After treatment in accordance with the present invention, these problems were eliminated while retaining the desired bulk density without any significant adverse affect on solubility, notwithstanding the larger particles. For all other maltodextrin starting materials used in this example, the solubility was inferior to that obtained after treatment in accordance with the present invention.

A summary of the increase in specific surface area, for each of the examples in which this parameter was measured, expressed as the ratio of the specific surface area of the treated material (TM) to the specific surface area of the starting material (SM), is set forth below.

| Example | Ratio of Specific Surface Areas, TM/SM |
|---|---|
| 2 | 6.6 |
| 3 | 5.6 |
| 4 | 5.9 |
| 5A | 4.1 |
| 5B | 9.1 |

Thus the increase in specific surface area for materials treated in accordance with the present invention ranged from a low of about 4 times the specific surface area of the starting material to greater than 9, for −100 mesh particles. Particles produced in accordance with the present invention would have a specific surface area at least three times greater than that of the starting material, e.g. at least 0.6 $m^2/g$ for particles of minus 100 mesh.

All of the processing equipment described in conjunction with FIGS. 1 and 2 is of conventional construction, commercially available and familiar to those skilled in the art.

The foregoing detailed description has been given for clearness of understanding only, and no unnecessary limitations should be understood therefrom, as modification will be obvious to those skilled in the art.

I claim:

1. A method for treating particles of a starch hydrolyzate product produced by the partial hydrolysis of cereal and root based starches, to improve the solubility and bulk density properties thereof, said method comprising the steps of:

mixing said particles of said starch hydrolyzate product with an added liquid which will occupy spaces between the particles when they are compacted;

forming a blend of said particles and said added liquid as a result of said mixing step;

providing said blend with a water content derived from the bound water in said maltodextrin and the water in said added liquid;

controlling said water content of the blend, by controlling the amount of said added liquid and the concentration thereof, so that the blend's total water content is greater than 3 wt.% and no greater than about 7 wt.%;

compacting said blend of particles and liquid between a pair of compacting rolls to form a sheet of compacted material composed of formerly discrete starch hydrolyzate particles crushed together, with said liquid occupying spaces between said crushed-together particles;

breaking said sheet of compacted material, after said compacting, into compacted particles of said material, wherein at least a substantial portion of said particles have a surface topography comprising cracks, crevices and fissures as a result of said above-recited steps;

and drying said material after said breaking to eliminate said liquid which occupied the spaces between the particles;

said liquid being one which has the ability to blend with said particles and to lubricate said compacting rolls and which is more volatile than water to facilitate the removal of the liquid during said drying step;

said liquid being selected from the group consisting of ethyl alcohol, acetone, hexane, cyclohexane, methyl ethyl ketone, ethyl acetate, propyl alcohol, butyl alcohol and pentyl alcohol.

2. A method as recited in claim 1 wherein:

said compacting comprises squeezing some of said liquid to the exterior of said sheet to coat the surfaces of said pair of compacting rolls with said liquid so as to cool and lubricate said rolls and prevent said particles undergoing compacting from sticking to said roll surfaces;

said compacting being performed without employing an extraneous lubricant on the surface of said compacting rolls.

3. A method as recited in claim 1 wherein:

said compacting is performed without employing an extraneous lubricant on the surface of said compacting rolls.

4. A method as recited in claim 1 wherein:

said particles of starch hydrolyzate product comprises 4-6 wt.% water before said mixing;

said liquid is present in said blend in an amount which is 5-15 wt.% of the weight of said starch hydrolyzate product;

and said liquid has a concentration greater than 90 wt.%.

5. A method as recited in claim 1 wherein said drying comprises driving off said liquid from said compacted particles by heating at a temperature in the range 40°-100° C.

6. A method as recited in claim 1 and comprising:

screening said particles, after said breaking step, to provide a particle size which is principally minus 30 mesh to plus 80 mesh.

7. A method as recited in claim 1 wherein said compacting comprises exerting a pressure on the blend which produces an untapped bulk density, after said drying, greater than 0.5 g/cc for particles in the size −30 to +80 mesh, without causing substantial sticking to the rolls.

8. A method as recited in claim 7 wherein:

said compacting rolls provide a compacting pressure of 60-100 kg/cm².

* * * * *